(12) United States Patent
Kawai

(10) Patent No.: US 10,694,104 B2
(45) Date of Patent: Jun. 23, 2020

(54) IMAGE PROCESSING APPARATUS, IMAGE CAPTURING APPARATUS, AND IMAGE PROCESSING METHOD

(71) Applicant: CANON KABUSHIKI KAISHA, Tokyo (JP)

(72) Inventor: Yusuke Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/150,116

(22) Filed: Oct. 2, 2018

(65) Prior Publication Data

US 2019/0104253 A1 Apr. 4, 2019

(30) Foreign Application Priority Data

Oct. 4, 2017 (JP) .................................. 2017-194698

(51) Int. Cl.
| | |
|---|---|
| *H04N 5/232* | (2006.01) |
| *G06T 3/00* | (2006.01) |
| *G06T 3/40* | (2006.01) |
| *H04N 5/272* | (2006.01) |

(52) U.S. Cl.
CPC ....... *H04N 5/23238* (2013.01); *G06T 3/0075* (2013.01); *G06T 3/4038* (2013.01); *H04N 5/272* (2013.01)

(58) Field of Classification Search
CPC .... H04N 5/23238; H04N 5/272; H04N 5/349; G06T 3/00–02; G06T 3/0075; G06T 3/4038
See application file for complete search history.

(56) References Cited

U.S. PATENT DOCUMENTS

| | | | |
|---|---|---|---|
| 7,133,068 B2 * | 11/2006 | Fisher .................. | H04N 1/3876 348/218.1 |
| 2016/0110848 A1 * | 4/2016 | Gray ........................ | G06T 7/11 382/173 |

FOREIGN PATENT DOCUMENTS

JP 201334158 A 2/2013

\* cited by examiner

*Primary Examiner* — Lin Ye
*Assistant Examiner* — Chriss S Yoder, III
(74) *Attorney, Agent, or Firm* — Canon U.S.A., Inc. IP Division

(57) ABSTRACT

An image processing apparatus cuts out a plurality of background images and foreground images from a plurality of images, and stores a plurality of cutout foreground images and an alignment coefficient calculated from an image prior to cutout of each foreground image, the plurality of foreground images being stored in association with the alignment coefficient. Moreover, the image processing apparatus generates a background combined image by combining cutout background images, and selects any of the stored foreground images based on designation of a position in the background combined image. Then, image processing apparatus determines an alignment coefficient of the selected foreground image by using the alignment coefficient associated with the selected foreground image, and combines the selected foreground image and the background combined image.

11 Claims, 11 Drawing Sheets

1ST IMAGE

2ND IMAGE

3RD IMAGE

4TH IMAGE

1ST IMAGE

1ST + 2ND IMAGES

1ST + 2ND + 3RD IMAGES

1ST + 2ND + 3RD + 4TH IMAGES

IMAGE PROCESSING APPARATUS, IMAGE CAPTURING APPARATUS, AND IMAGE PROCESSING METHOD

BACKGROUND

Field of the Disclosure

The present disclosure relates to an image processing apparatus that combines a plurality of images to generate a panoramic image.

Description of the Related Art

There is a method by which an image capturing apparatus such as a digital camera captures a plurality of images while panning, and connects the captured images to generate a panoramic image. Since a conventional image capturing apparatus for generating a panoramic image is not intended to capture a panoramic image including a photographer, generation of such a panoramic image is difficult. Japanese Patent Application Laid-Open No. 2013-34158 discusses a method by which an image capturing apparatus is rotated using a rotation unit with a tripod fixed to generate a panoramic image in which a photographer appears.

However, since the method discussed in Japanese Patent Application Laid-Open No. 2013-34158 needs a fixation device such as a tripod, the method is not convenient. It is conceivable that a panoramic image including an image of a photographer is generated by a method by which a photographer rotates while capturing images with an image capturing apparatus directed toward the photographer.

FIGS. 11A and 11B are diagrams illustrating a problem of a panoramic image including a photographer as a subject. As illustrated in FIG. 11A, if a photographer holds an image capturing apparatus such as a digital camera and captures images while panning (rotating) with the image capturing apparatus directed toward the photographer, a panoramic image including the photographer can be generated even by a conventional method. However, the use of the conventional panoramic image capturing method generates a panoramic image in which multiple human figures of the same photographer appear as illustrated in FIG. 11B.

Accordingly, there is a need for generation of a suitable panoramic image in which multiple human figures of the same person do not appear

SUMMARY

According to an aspect of the present disclosure, an image processing apparatus includes at least one memory configured to store instructions, and at least one processor connected to the at least one memory and configured to execute the instructions to determine an alignment coefficient between images, cut out a plurality of background images and foreground images from a plurality of images, store a plurality of foreground images cut out from the plurality of images and an alignment coefficient calculated from an image prior to cutout of each foreground image, the plurality of foreground images being stored in association with the alignment coefficients, and generate a background combined image by combining background images cut out from the plurality of images, wherein the at least one processor executes further instruction to select any of the stored plurality of foreground images based on designation of a position in the background combined image, determine an alignment coefficient of the selected foreground image by using the alignment coefficient stored in association with the selected foreground image, and combine the selected foreground image and the background combined image by using the alignment coefficient of the selected foreground image.

Further features of the present disclosure will become apparent from the following description of exemplary embodiments (with reference to the attached drawings).

DESCRIPTION OF THE EMBODIMENTS

Exemplary embodiments are hereinafter described in detail with reference to the drawings.

Figure 1:
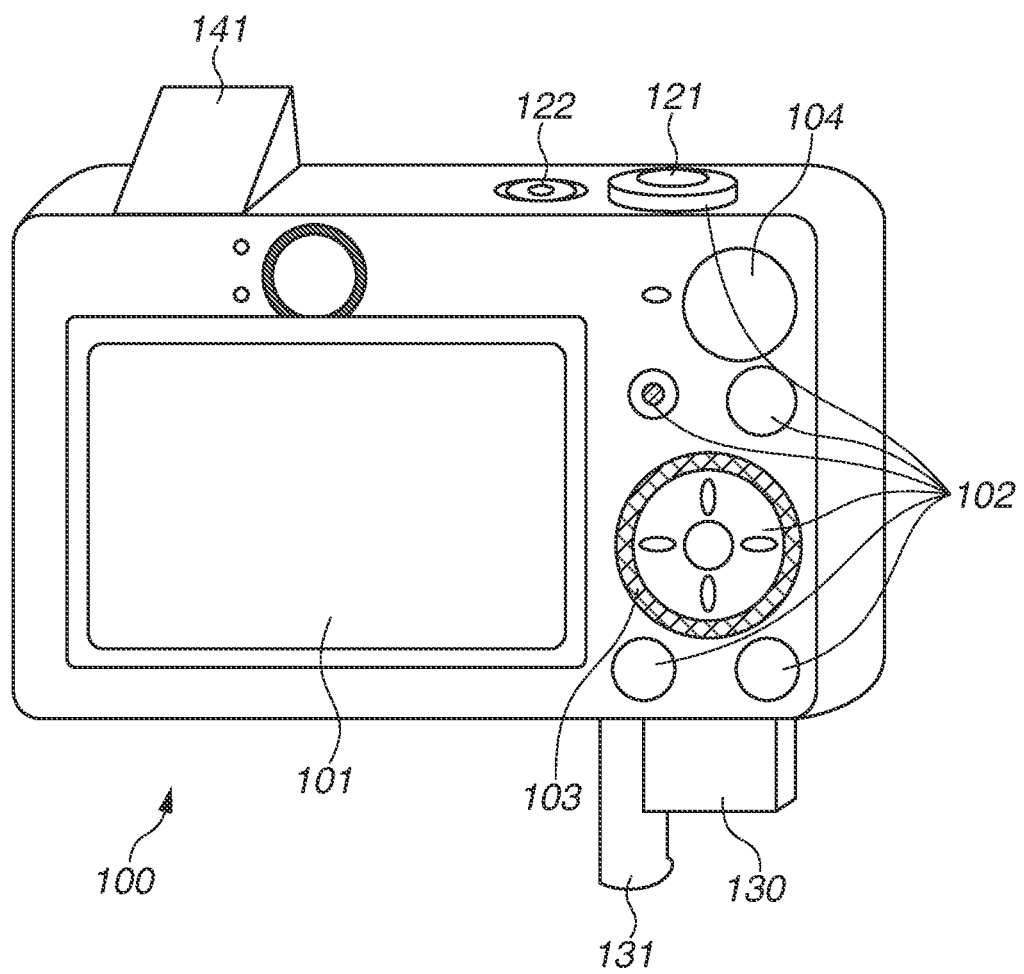
FIG. 1 is a perspective back view illustrating a schematic configuration of a digital camera according to one or more aspects of the present disclosure.

FIG. 1 is a perspective back view illustrating a schematic configuration of a digital camera according to an exemplary embodiment.

A digital camera 100 includes a display unit 101 and an operation unit 102 on the back thereof. The display unit 101 displays an image and various information, and the operation unit 102 includes operation members such as various switches and buttons that receive various operations from a user. Moreover, a mode selection switch 104 and a rotatable controller wheel 103 are arranged on the back of the digital camera 100. The mode selection switch 104 is used to select a mode such as an image capturing mode. Moreover, the digital camera 100 includes a shutter button 121, a power switch 122, and a flash unit 141 that are arranged on the top surface thereof. The shutter button 121 is used to issue an image capturing instruction, and the power switch 122 is used to switch the power of the digital camera 100 between on and off. The flash unit 141 irradiates a subject with a flash of light.

The digital camera 100 can be connected to an external apparatus via wired or wireless communication, so that image data (e.g., still image data, moving image data) can be output to the external apparatus. On the bottom surface of the digital camera 100, a storage medium slot (not illustrated) that can be opened and closed by a lid 131 is arranged. A storage medium 130 such as a memory card can be inserted into and removed from such a storage medium slot.

The storage medium 130 stored in the storage medium slot can communicate with a system control unit 210 (see FIG. 2) of the digital camera 100. The storage medium 130 is not limited to a medium such as a memory card that can be inserted into or removed from the storage medium slot. The storage medium 130 can be an optical disk or a magnetic disk such as hard disk. Moreover, the storage medium 130 can be embedded in a body of the digital camera 100.

Figure 2:
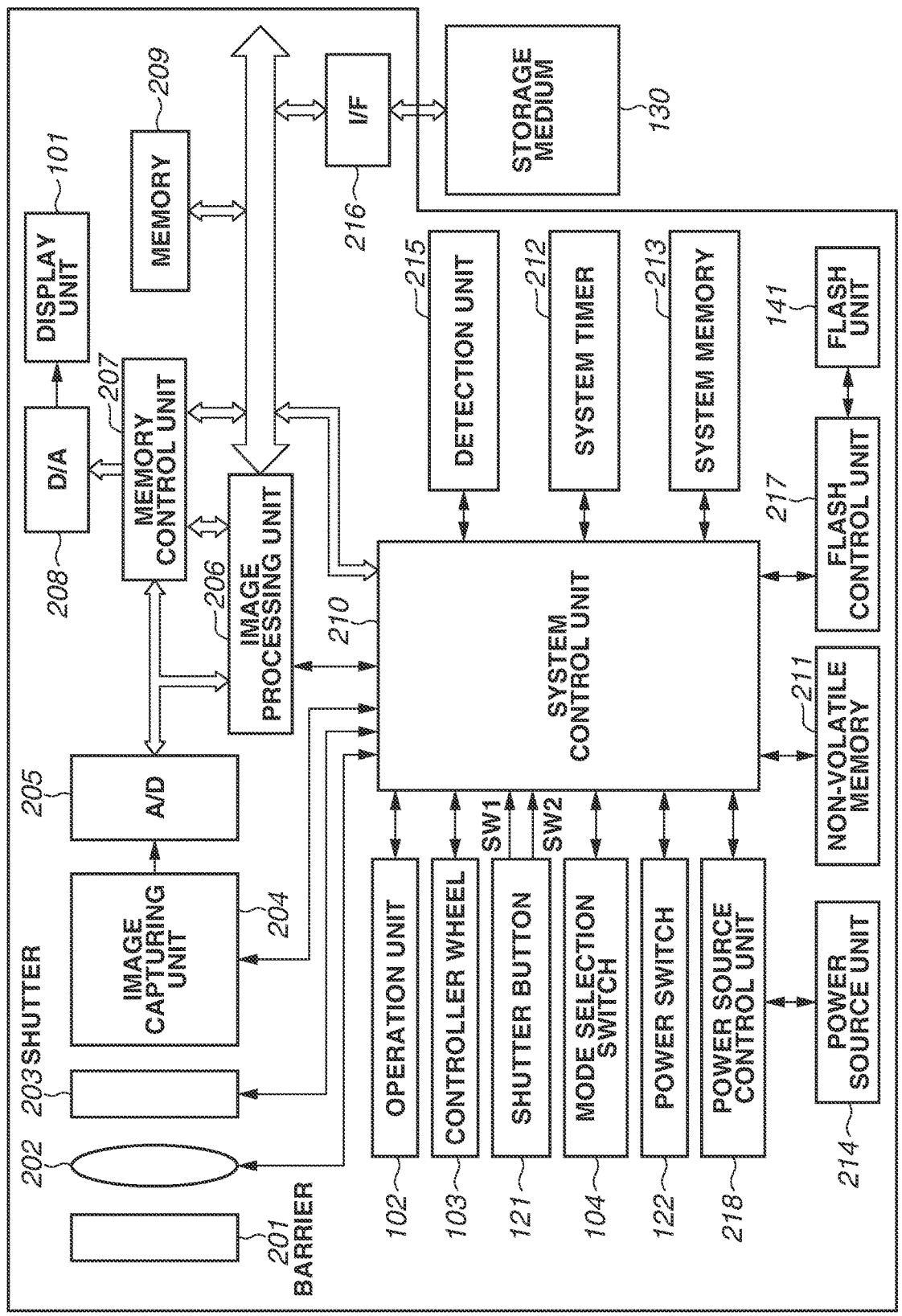
FIG. 2 is a block diagram illustrating a hardware configuration of the digital camera according to one or more aspects of the present disclosure.

FIG. 2 is a block diagram illustrating a hardware configuration of the digital camera 100. The digital camera 100 includes a barrier 201, an imaging lens 202, a shutter 203, and an image capturing unit 204. The barrier 201 covers an image capturing optical system to prevent the image capturing optical system from being soiled or damaged. The imaging lens 202 includes a lens group including a zoom lens and a focus lens to configure the image capturing optical system. The shutter 203 has a diaphragm function to adjust an exposure amount with respect to the image capturing unit 204. The image capturing unit 204 is an image capturing element for converting an optical image into electric signals (analog signals). For example, the image capturing unit 204 is an image sensor such as a charge-coupled device (CCD) sensor and a complementary metal-oxide-semiconductor (CMOS) sensor with Bayer array structure in which red, green, and blue (RGB) pixels are regularly arranged. The shutter 203 can be a mechanical shutter, or an electric shutter that controls accumulation time by control of reset timing of an image capturing element.

Moreover, the image capturing unit 204 may have a structure by which a stereo image can be acquired, the structure including a plurality of photoelectric conversion units arranged in one pixel. In such a case, automatic focusing (AF) processing described below can be performed more quickly.

The digital camera 100 includes an analog-to-digital (A/D) converter 205, an image processing unit 206, a memory control unit 207, a digital-to-analog (D/A) converter 208, a memory 209, and a system control unit 210. The image capturing unit 204 outputs analog signals to the A/D converter 205. The A/D converter 205 converts the acquired analog signals into image data formed of digital signals, and then outputs the image data to the image processing unit 206 or the memory control unit 207.

The image processing unit 206 performs processing, for example, correction processing such as pixel interpolation and shading correction, white balance processing, gamma correction processing, and color conversion processing with respect to the image data acquired from the A/D converter 205 or the data acquired from the memory control unit 207. Moreover, the image processing unit 206 performs cutout processing and variable magnification processing on an image, thereby providing an electronic zoom function. Moreover, the image processing unit 206 performs predetermined calculation processing by using image data of a captured image, and the system control unit 210 performs control such as exposure control and range finding control based on a calculation result acquired by the image processing unit 206. For example, the system control unit 210 performs AF processing according to a through-the-lens (TTL) method, automatic exposure (AE) processing, and electronic flash pre-emission (EF) processing. The image processing unit 206 performs predetermined calculation processing by using the image data of the captured image, and the system control unit 210 performs automatic white balance (AWB) processing according to the TTL method by using a calculation result acquired by the image processing unit 206.

The image processing unit 206 includes an image combining processing circuit that generates a panoramic image by combining a plurality of images, and determines a result of such combining. The image combining processing circuit can perform not only simple average combining processing, but also processing such as comparison lighten composition and comparison darken composition. In the comparison lighten composition or the comparison darken composition, a pixel having a lightest value or a darkest value in each area of combining target image data is selected to generate data of one image. Moreover, the image processing unit 206 evaluates and determines a combining result based on a particular reference. For example, if the number of images that have been combined is less than a predetermined number or a length of the combined image is less than a reference value, the image processing unit 206 determines that the combining has failed. The system control unit 210 can use software having a function of performing the image combining processing instead of the configuration including the image processing unit 206.

The image data to be output from the A/D converter 205 is written in the memory 209 via the image processing unit 206 and the memory control unit 207 or via the memory control unit 207. The memory 209 also serves as an image display memory (a video memory) for storing image data to be displayed on the display unit 101. The memory 209 has a storage capacity capable of storing a predetermined number of still images, panoramic images (wide-angle images), and panoramic image combining results. Moreover, the memory 209 can be used as a working area into which, for example, a program read from a non-volatile memory 211 by the system control unit 210 is loaded.

Image display data (digital data) stored in the memory 209 is transmitted to the D/A converter 208. The D/A converter 208 converts the received digital data into analog signals, and supplies the analog signals to the display unit 101. Thus, an image is displayed on the display unit 101. The display unit 101 is a display device such as a liquid crystal display and an organic electroluminescence (EL) display, and displays an image based on the analog signals from the D/A converter 208. The system control unit 210 switches on and off display of an image on the display unit 101. The system control unit 210 switches off display of an image, so that electric power consumption can be reduced. The D/A converter 208 can convert digital signals to be accumulated in the memory 209 via the A/D converter 205 from the image capturing unit 204 into analog signals, so that images can be successively displayed on the display unit 101. This enables the digital camera 100 to have an electric viewfinder function of displaying live view.

The digital camera 100 includes the non-volatile memory 211, a system timer 212, a system memory 213, a detection unit 215, and a flash control unit 217. The non-volatile memory 211 is a memory (e.g., an electrically erasable programmable read only memory (EEPROM)) that can electrically delete and store information including a program and data. The non-volatile memory 211 stores, for example, a program to be executed and an operation constant to be used by the system control unit 210. In addition, the non-volatile memory 211 includes an area in which system information is stored, and an area in which user setting information is stored. The system control unit 210 reads out various information and setting stored in the non-volatile memory 211 to reconstruct the information and the setting when the digital camera 100 is activated.

The system control unit 210 includes a central processing unit (CPU), and executes various program codes stored in the non-volatile memory 211 to comprehensively control operations of the digital camera 100. The program, the operation constant, and a variable that are read out from the non-volatile memory 211 by the system control unit 210 are loaded into the system memory 213. As for the system memory 213, a random access memory (RAM) is used. Moreover, the system control unit 210 controls components such as the memory 209, the D/A converter 208, and the display unit 101 to perform display control. The system timer 212 measures time to be used for various control and time of an internal clock. The flash control unit 217 controls a flash of light emitted by the flash unit 141 according to brightness of a subject. The detection unit 215 includes a gyroscope and a sensor to acquire information such as angular speed information and orientation information of the digital camera 100. The angular speed information includes information of angular speed and angular acceleration at the time of panoramic image capturing performed by the digital camera 100. Moreover, the orientation information includes information such as inclination of the digital camera 100 with respect to a horizontal direction.

The display unit 101, the operation unit 102, the controller wheel 103, the shutter button 121, the mode selection switch 104, the power switch 122, and the flash unit 141 illustrated in FIG. 2 are substantially the same as those described with reference to FIG. 1.

The various operation members of the operation unit 102 are used, for example, for selection of various functional icons to be displayed on the display unit 101. Selection of a predetermined functional icon allocates a function to the various operation members on a situation basis. That is, each of the various operation members of the operation unit 102 operates as a functional button. Examples of the functional buttons include an end button, a back button, an image feeding button, a jump button, a narrowing-down button, an attribute change button, and a display (DISP) button. For example, if a menu button is pressed, a menu screen for various settings is displayed on the display unit 101. A user uses the menu screen displayed on the display unit 101 and buttons such as a four-direction button for designating vertical and horizontal directions and a setting (SET) button, thereby intuitively performing a setting operation.

The controller wheel 103 as a rotatable operation member is used in addition to the four-direction button, for example, when a user designates a selection item. Rotation of the controller wheel 103 generates an electrical pulse signal according to an operation amount (e.g., a rotation angle or the number of rotations). The system control unit 210 analyzes the pulse signal to control each unit of the digital camera 100.

The shutter button 121 includes a first switch SW1 and a second switch SW2. The first switch SW1 is turned on in a half-press state in which the shutter button 121 is operated halfway, so that a signal for image capturing preparation instruction is transmitted to the system control unit 210. Upon receipt of the signal indicating that the first switch SW1 has been turned on, the system control unit 210 starts an operation such as AF processing, automatic exposure (AE) processing, automatic white balance (AWB) processing, and electronic flash pre-emission (EF) processing. The second switch SW2 is turned on in a full-press state in which the operation of the shutter button 121 is completed, so that a signal instructing image capturing start is transmitted to the system control unit 210. Upon receipt of the signal indicating that the second switch SW2 has been turned on, the system control unit 210 performs a series of image capturing operations from reading of a signal from the image capturing unit 204 to writing of image data to the storage medium 130.

The mode selection switch 104 is used to switch an operation mode of the digital camera 100 between various modes such as a still-image capturing mode, a moving-image capturing mode, and a playback mode. The still-image capturing mode includes, in addition to a mode such as an automatic image capturing mode, a panoramic image capturing mode in which a plurality of images captured by panoramic image capturing is combined to generate a panoramic image.

The digital camera 100 includes a power source unit 214 and a power source control unit 218. The power source unit 214 is a primary battery such as an alkaline battery and a lithium battery, a secondary battery such as a nickel-cadmium (NiCd) battery, a nickel-metal hydride (NiMH) battery, and a lithium-ion (Li) battery, or an alternating current (AC) adapter. The power source unit 214 supplies electric power to the power source control unit 218. The power source control unit 218 detects the presence or absence of attachment of a battery in the power source unit 214, a type of the battery, and a remaining battery capacity, and supplies a necessary voltage for a necessary period to each unit including the storage medium 130 based on an instruction of the system control unit 210 and a result of such detection.

The digital camera 100 includes a storage medium interface (I/F) 216 for enabling communication between the storage medium 130 and the system control unit 210 when the storage medium 130 is attached to a storage medium slot (not illustrated). Since the storage medium 130 has been already described in detail with reference to FIG. 1, a description thereof is omitted herein.

Next, a panoramic image capturing method and a method for generating a panoramic image by combining a plurality of captured images will be described. A description is first given of processing in which a predetermined area is cut out from image data of a captured image for generation of a panoramic image.

FIGS. 3A, 3B, 3C, and 3D are diagrams illustrating a relation between a direction in which the digital camera 100 in panoramic image capturing operation using a conventional method moves and a cutout area of image data.

Figure 3A:
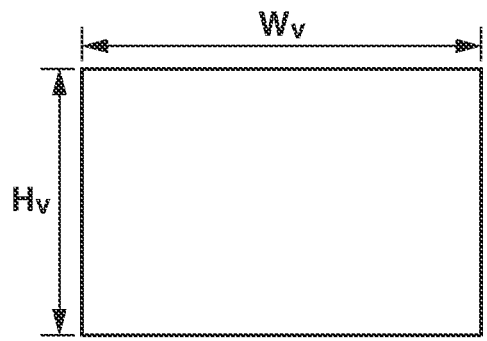
FIGS. 3A, 3B, 3C, and 3D are diagrams illustrating a relation between a direction in which a digital camera in panoramic image capturing operation using a conventional method moves and a cutout area of image data.
Figure 3B:
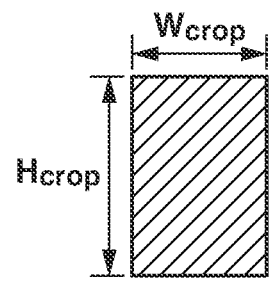

FIG. 3A illustrates an effective image area of an image capturing element included in the image capturing unit 204. In FIG. 3A, the effective image area has the number of effective pixels Wv in a horizontal direction and the number of effective pixels Hv in a vertical direction. FIG. 3B illustrates a cutout area that is cut out from image data of a captured image. In FIG. 3B, the cutout area has the number of cutout pixels Wcrop in a horizontal direction and the number of cutout pixels Hcrop in a vertical direction.

Figure 3C:
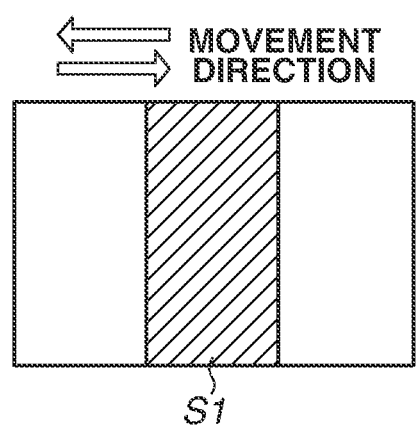

FIG. 3C illustrates a cutout area with respect to image data in a case where panoramic image capturing is performed while the digital camera 100 is being moved in a horizontal direction indicated by an arrow. In FIG. 3C, a hatched area S1 indicates an area that is cut out from the image data, and the area S1 satisfies Expressions 1 and 2.

$$Wv > Wcrop \quad \text{Expression 1}$$

$$Hv = Hcrop \quad \text{Expression 2}$$

Figure 3D:
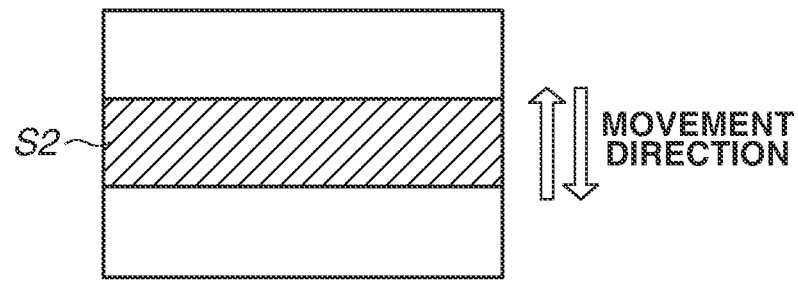

Similarly, FIG. 3D illustrates a cutout area with respect to image data in a case where a panoramic image capturing is performed while the digital camera 100 is being moved in a perpendicular direction indicated by an arrow. In FIG. 3D, a hatched area S2 indicates a cutout area of the image data, and the area S2 satisfies Expressions 3 and 4.

$$Wv = Wcrop \quad \text{Expression 3}$$

$$Hv > Hcrop \quad \text{Expression 4}$$

A cutout area of image data of a captured image can be set differently for each image data. Moreover, as for image data at the beginning of panoramic image capturing and the end of panoramic image capturing, a cutout area can be widened to widen an angle of view. A cutout area of image data can be determined, for example, by a difference between an angle of the digital camera 100 immediately after image capturing and an angle of the digital camera 100 in one preceding frame. By cutting out and storing only image data that is necessary for combining processing for generation of a panoramic image, a storage capacity of the memory 209 can be saved.

The aforementioned cutout area can be set as close as possible to a middle portion of a captured image. In general, a middle portion of a captured image has little distortion. Thus, if a cutout area is set in a middle portion of an image, a combined image to be generated can be more natural.

Next, a combining method for generation of a panoramic image will be described. The system control unit 210 reads out the cutout areas stored at the time of panoramic image capturing from the memory 209, and performs panoramic image generation combining processing on the image data which has been read out.

Figure 4A:
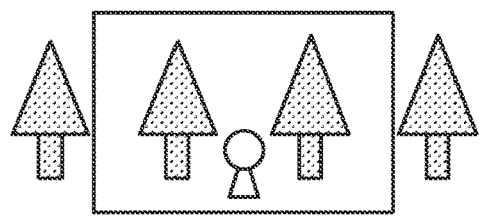
FIGS. 4A, 4B, 4C, 4D, 4E, and 4F are diagrams illustrating a processing flow of combining processing for generation of a panoramic image by using the conventional method.
Figure 4B:
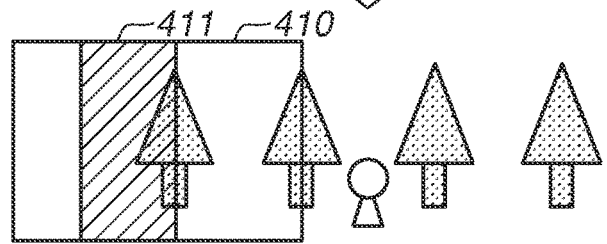
Figure 4C:
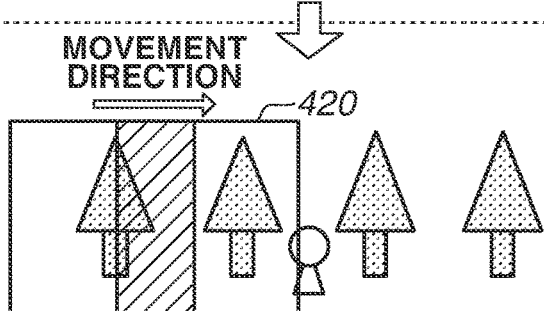
Figure 4D:
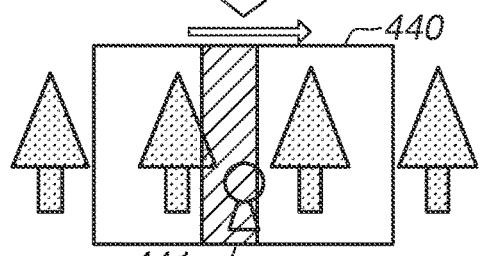
Figure 4E:
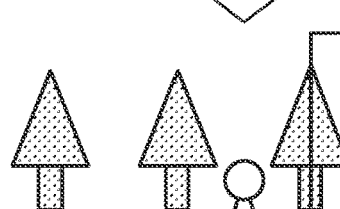

FIGS. 4A, 4B, 4C, 4D, 4E, and 4F are diagrams illustrating a processing flow of combining processing for generation of a panoramic image by using a conventional method. In FIGS. 4A, 4B, 4C, 4D, 4E, and 4F, a dot-hatched area represents an area in which a row of trees in an image capturing field is schematically illustrated, whereas a slant-line hatched area represents a cutout area of image data. FIG. 4A illustrates a state in which a user presses the shutter button 121 and the first switch SW1 is turned on. Moreover, FIG. 4A illustrates that the user is to make a focus adjustment with respect to a main subject. FIG. 4B illustrates a position at which the second switch SW2 of the shutter button 121 is turned on. In FIG. 4B, an angle of view is set so as to match one end of a panoramic image the user intends to acquire by combining. In FIG. 4B, the image capturing unit 204 captures an image 410. Each of FIGS. 4C through 4E schematically illustrates a state in which panoramic image capturing is performed while the digital camera 100 is being moved toward the other end of the panoramic image the user intends to acquire aby combining. FIG. 4E illustrates a state in which the user stops pressing the shutter button 121 and the panoramic image capturing is completed. In FIGS. 4B through 4E, although the image capturing unit 204 captures a total of 7 images that are images 410, 420, 430, 440, 450, 460 and 470, the images 430, 450, and 460 are not illustrated. The image processing unit 206 performs cutout processing with respect to the images 410 through 470 captured by the image capturing unit 204 to generate respective cutout images 411, 421, 431, 441, 451, 461, and 471. The system control unit 210 can determine a width of a cutout image beforehand. However, a width of a cutout image can be changed according to a moving speed of the digital camera 100 in panoramic image capturing operation.

Figure 4F:
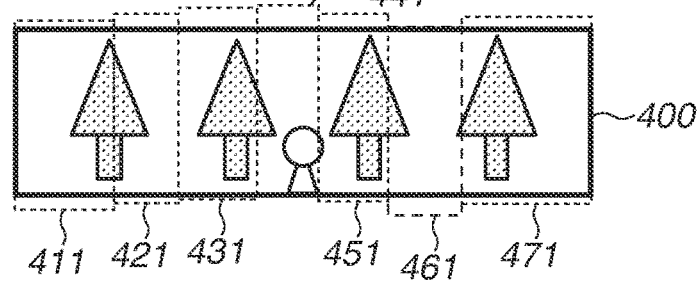

FIG. 4F illustrates a panoramic image that is generated by the image processing unit 206 by combining the plurality of images captured by the image capturing unit 204. Herein, the system control unit 210 performs alignment processing with respect to the images before combining the images. Moreover, since upper sides of the cutout images 411 through 471 do not match each other or lower sides of the cutout images 411 through 471 do not match each other due to, for example, camera shake, the image processing unit 206 also performs cutout processing with respect to a longitudinal direction. As a result, the image processing unit 206 generates a panoramic image as illustrated by an area 400.

The system control unit 210 performs alignment processing based on a plurality of motion vectors detected by the image processing unit 206. In one example of the alignment processing, the image processing unit 206 divides a cutout area into small blocks having optional size, and calculates a corresponding point at which a sum of absolute difference (SAD) of brightness is minimum for each small block. The system control unit 210 can calculate a motion vector from the calculated corresponding point at which a SAD is minimum. In addition to the SAD, the system control unit 210 can use a sum of squared difference (SDD) or a normalized cross correlation (NCC).

Hereinafter, the combining processing will be described in detail by using affine transformation as an example. From coordinates (x, y) of a feature point as an optional reference and the aforementioned motion vector, coordinates (u, v) of a feature point as a destination can be acquired. The coordinates (x, y) and the coordinates (u, v) have a relation expressed by Expression 5.

$$\begin{pmatrix} u \\ v \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \quad \text{Expression 5}$$

If there are thee motion vectors that are not parallel to one another, a 3×3 matrix illustrated in Expression 5 can be uniquely calculated. Such a matrix or elements a through f are defined as affine transformation coefficients. All of points in an image are transformed using the calculated matrix so that alignment processing can be performed.

In the examples illustrated in FIGS. 4A, 4B, 4C, 4D, 4E, and 4F, the cutout images 411 through 471 are adjacent to each other and do not have areas overlaid with each other for the sake of facilitation of the description. If there are areas that are overlaid, the image processing unit 206 considers the center of the overlaid areas as a boundary, and outputs pixel information of one cutout area to the left side of the boundary and pixel formation of the other cutout area to the right side of the boundary of a combined image. Alternatively, the image processing unit 206 may output a value acquired by combining 50% of pixel information of each of both cutout areas to the boundary. In such a case, the image processing unit 206 performs combining processing while increasing a proportion of the one cutout area on the left side of the boundary and a proportion of the other cutout area on the right side of the boundary as a distance from the boundary increases.

However, if the aforementioned combining method for generation of a panoramic image is applied to self-image capturing, the following problems occur. If the digital camera 100 is panned in self-image capturing, a photographer intends to capture an image of himself/herself Thus, an image capturing unit is directed toward the photographer to capture images of the photographer in the entire course of the panning operation. Consequently, unlike a related-art panoramic image, a figure of the photographer appears in multiple images captured by the panning operation in self-image capturing.

Figure 5A:
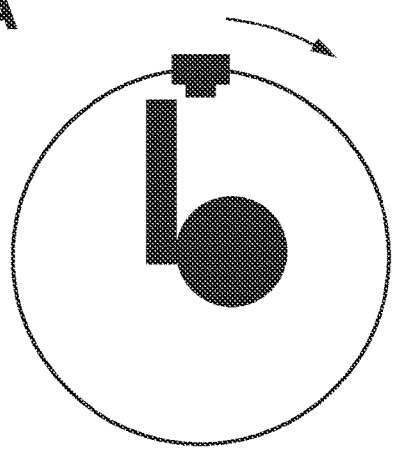
FIGS. 5A and 5B are diagrams illustrating panoramic image capturing in a self-image capturing manner according to one or more aspects of the present disclosure.
Figure 5B:
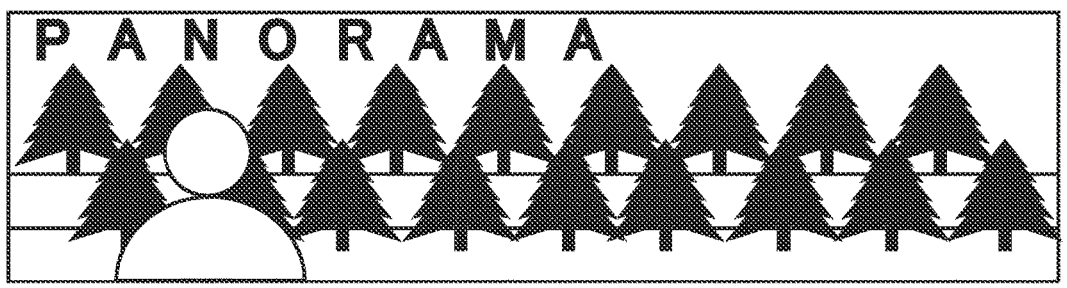

FIGS. 5A and 5B are diagrams illustrating panoramic image capturing in a self-image capturing manner according to the exemplary embodiment. As illustrated in FIG. 5A, a photographer holds an image capturing apparatus to capture images with the image capturing apparatus directed toward himself/herself while panning (rotating) the image capturing apparatus. A panoramic image expected by the photographer is an image in which one human figure of the photographer appears in front of background (a row of trees) as illustrated in FIG. 5B. However, the use of the conventional panoramic image capturing method causes a human figure of the photographer to appear in each of all images captured during the panning operation. Consequently, a panoramic image has multiple human figures of the photographer.

According to the present exemplary embodiment, a foreground image is extracted during panoramic image capturing, and a position of the foreground image can be optionally combined to solve the aforementioned problem, unlike the conventional technique illustrated in FIGS. 4A, 4B, 4C, 4D, 4E, and 4F. Hereinafter, a processing flow of the present exemplary embodiment will be described in detail with reference to the drawings.

Figure 6:
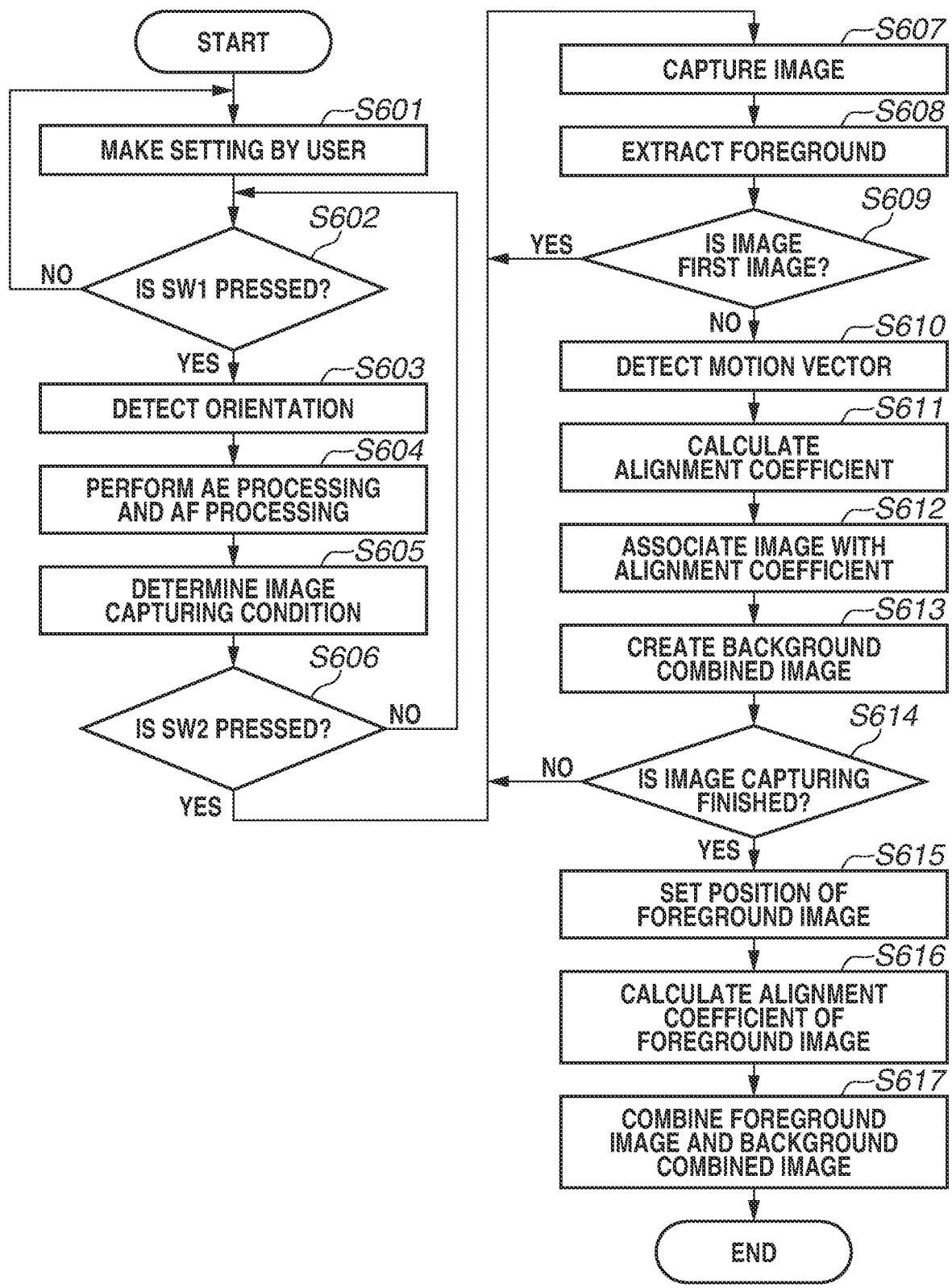
FIG. 6 is a flowchart of processing according to one or more aspects of the present disclosure.

FIG. 6 is a flowchart of processing according to the present exemplary embodiment. If a user selects a self-image capturing panorama mode by using the mode selection switch 104, the digital camera 100 executes the processing illustrated in FIG. 6. Alternatively, the user can operate a button arranged in the operation unit 102 or a touch panel also serving as the display unit 101 to select a self-image capturing panorama mode on a menu screen of the digital camera 100.

In step S601, the user makes a setting for panoramic image capturing. For example, the user sets an angle of view of a panoramic combined image and a panning direction. If the user does not make a setting in step S601, in panoramic image capturing, the digital camera 100 uses an initial setting or a setting used at previous panoramic image capturing.

Subsequently, in step S602, the system control unit 210 determines whether the first switch SW1 has been pressed. If the system control unit 210 determines that the first switch SW1 has been pressed (YES in step S602), the processing proceeds to step S603. If the system control unit 210 determines that the first switch SW1 has not been pressed (NO in step S602), the processing returns to step S601.

In step S603, the detection unit 215 performs orientation detection processing. In the orientation detection processing, the detection unit 215 determines a panning direction of the digital camera 100. If the user has set a panning direction of the digital camera 100 in step S601, the system control unit 210 compares the set panning direction of the digital camera 100 with an actual panning direction. If the set panning direction of the digital camera 100 differs from the actual panning direction, the system control unit 210 appropriately issues a warning.

In step S604, the digital camera 100 performs AE processing and AF processing.

In step S605, the system control unit 210 determines an image capturing condition such as an image capturing sensitivity based on a result of the AE processing in step S604.

In step S606, the system control unit 210 determines whether the second switch SW2 has been pressed. If the system control unit 210 determines that the second switch SW2 has not been pressed (NO in step S606), the processing returns to step S602 in which the system control unit 210 determines whether the first switch SW1 has remained pressed (half-pressed). If the system control unit 210 determines that the second switch SW2 has been pressed (YES in step S606), the processing proceeds to step S607. In step S607, the image capturing unit 204 captures an image under the image capturing condition determined in step S605.

In step S608, the system control unit 210 extracts foreground from each of the images captured by the image capturing unit 204 in step S607. If self-image capturing for capturing an image of a photographer is performed, foreground corresponds to a figure of the photographer. However, the present exemplary embodiment is not applied to only a figure of a self-image capturing photographer. For example, an apparatus capable of rotating about a table may be used, and panoramic image capturing may be performed toward the table while the apparatus is automatically rotating. In such a case, a subject such as a doll can be placed on the table, and the present exemplary embodiment can be applied.

Figure 7:
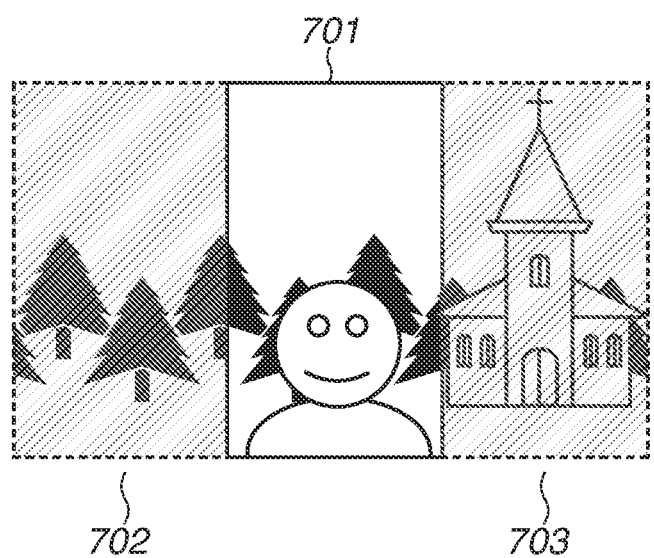
FIG. 7 is a diagram illustrating extraction of foreground and background according to one or more aspects of the present disclosure.

FIG. 7 is a diagram illustrating extraction of foreground and background according to the exemplary embodiment. The image illustrated in FIG. 7 is one of the plurality of images captured by the image capturing unit 204 in step S607 of the flowchart illustrated in FIG. 6. Since this image is captured using the self-image capturing method by the photographer, a figure of the photographer is in the image. The system control unit 210 uses processing such as known face detection processing to extract a human figure, identifies a rectangular area 701 including the figure of the photographer, and determines image areas 702 and 703 other than the area 701 as background. Alternatively, before panoramic image capturing is performed, the system control unit 210 may perform scan AF that repeats image capturing while moving a focus lens to determine a subject distance for each area. In such a case, the system control unit 210 extracts an area corresponding to range information having a predetermined value or less as a human figure area. Since a background portion does not include a figure of a photographer, the background portion is used in combining processing for generation of a panoramic image. In the description of the conventional panoramic image capturing technique (FIGS. 3A, 3B, 3C, and 3D, and FIGS. 4A, 4B, 4C, 4D, 4E, and 4F), a middle portion of an image is preferably cut out so as to be used in combining processing to reduce influence of distortion. However, in the present exemplary embodiment, prevention of foreground in a middle portion of an image from appearing for multiple times has priority over reduction of distortion influence, and the system control unit 210 uses images in areas on both sides of the image in combining processing. Alternatively, the system control unit 210 may use a rectangular area having a predetermined width on both sides of a human figure as a background portion in combining processing. If a figure of a photographer is present in a middle portion of an image, influence of distortion can be smaller as such a predetermined width becomes narrower. However, an angle of view to be covered with one image is narrower as the predetermined width becomes narrower. Consequently, a high panning speed may cause background to be not continuous, and thus an appropriate width is desirably set according to a panning speed.

Figure 11A:
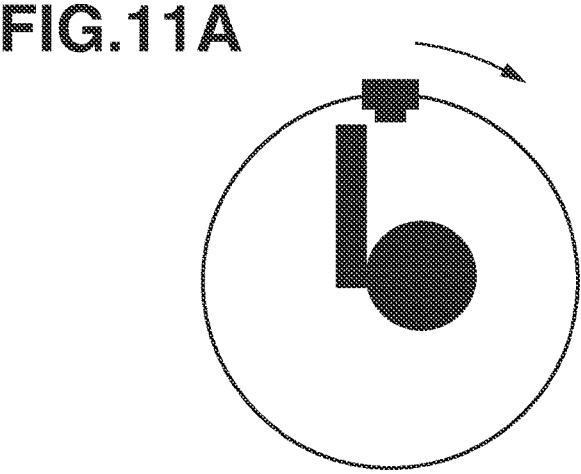
FIGS. 11A and 11B are diagrams illustrating a problem of a panoramic image capturing in a self-image capturing manner.
Figure 11B:
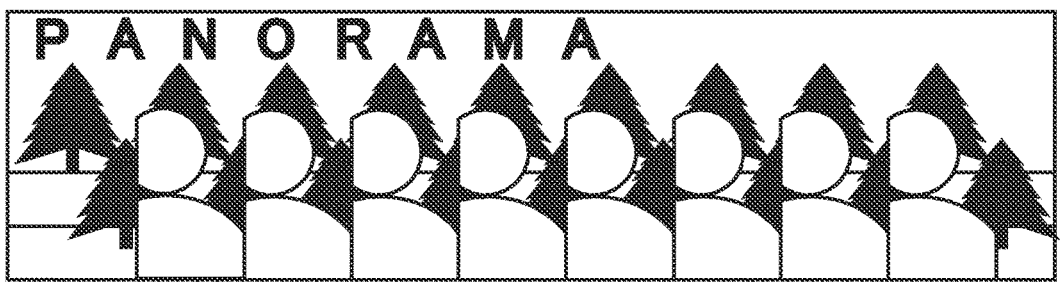

Since the area 701 includes a figure of the photographer, the use of such an area of each image in combining processing for generation of a panoramic image causes a plurality of photographer figures to appear as illustrated in FIG. 11B. Accordingly, the system control unit 210 considers that combining processing with respect to an image of the area 701 differs from combining processing with respect to images of the respective areas 702 and 703. Herein, the area 701 including the human figure of the photographer is called "foreground". As described above, the present exemplary embodiment is not applied only to a case where "foreground" is an area including a photographer. The present exemplary embodiment can be applied to various cases. For example, the system control unit 210 may use a convolutional neural network (CNN) having undergone learning as a foreground extraction unit and a general object recognition unit, thereby extracting a subject that can be foreground. In such a case, a user can set beforehand an object that is intended to be recognized as foreground.

In step S609, the system control unit 210 determines whether the image captured by the image capturing unit 204 in step S607 is a first image. The image captured by the image capturing unit 204 in step S607 must be a second or later image (NO in step S609) so that the processing can proceed to step S610 in which a motion vector is detected. If the system control unit 210 determines that the image is the first image (YES in step S609), the processing returns to step S607.

In step S610, the system control unit 210 uses two images successively captured by the image capturing unit 201 in step S607 to detect a motion vector. First, the image processing unit 206 sets a plurality of small blocks in one of the two images. Each of the small blocks is preferably set to have the same size. The image processing unit 206 can set small blocks in one portion of an image, instead of the entire image. The system control unit 210 selects any of the plurality of small blocks set in one of the images, and sets a search block in the other image. The search block is arranged in the same position as the selected small block, and is wider than the selected small block. The system control unit 210 extracts an area that has the highest correlation with the selected small block of the one image (an SAD value is minimum) within the search block in the other image. The system control unit 210 can calculate a motion vector corresponding to the small block from coordinates of a corresponding point that is the center of the extracted area and coordinates of a center position of the selected small block. The system control unit 210 performs such processing with respect to each of all the small blocks to calculate a motion vector corresponding to each of all the small blocks.

In step S611, the system control unit 210 calculates an alignment coefficient. The term "alignment coefficient" used herein represents a known coefficient such as an affine transformation coefficient and a projective transformation coefficient to be used for alignment processing. If only translational movement is to be performed, the system control unit 210 can use a mean value of corrected motion vectors. An alignment method is similar to the aforementioned alignment processing performed in the conventional panoramic image capturing. In the present exemplary embodiment, the affine transformation coefficient is calculated as an alignment coefficient as described above.

In step S612, the system control unit 210 cuts out a foreground image from the image captured by the image capturing unit 204 in step S607. The system control unit 210 associates the cutout foreground image with the alignment coefficient calculated in step S611, and stores such association in the memory 209. That is, the system control unit 210 associates an alignment coefficient calculated using the entire image with a foreground image cut out from the entire image. In addition to the alignment coefficient, the system control unit 210 stores information that indicates a cutout position indicating which portion has been cut out as a foreground image from an original image in the memory 209.

In step S613, the system control unit 210 cuts out a background image from the image captured by the image capturing unit 204 in step S607 to create a background combined image. The term "background combined image" used herein represents an image in which the background images (corresponding to the areas 702 and 703 illustrated in FIG. 7) extracted by the system control unit 210 in step S608 are combined. If there is an area overlaid with another area in creation of a background combined image, the processing as described above in the conventional technique with reference to FIGS. 4A, 4B, 4C, 4D, 4E, and 4F is performed.

Moreover, alignment processing is necessary in creation of a background combined image. In the alignment processing, the alignment coefficient calculated by the system control unit 210 in step S611 is used. Particularly, the system control unit 210 performs the alignment processing by using the alignment coefficient (associated in step S612) of each image from which the background image has been cut out. When the background images are cut out and combined in step S613, the original image acquired in step S607 is deleted from the memory. This can save a capacity of the memory.

Figure 8:
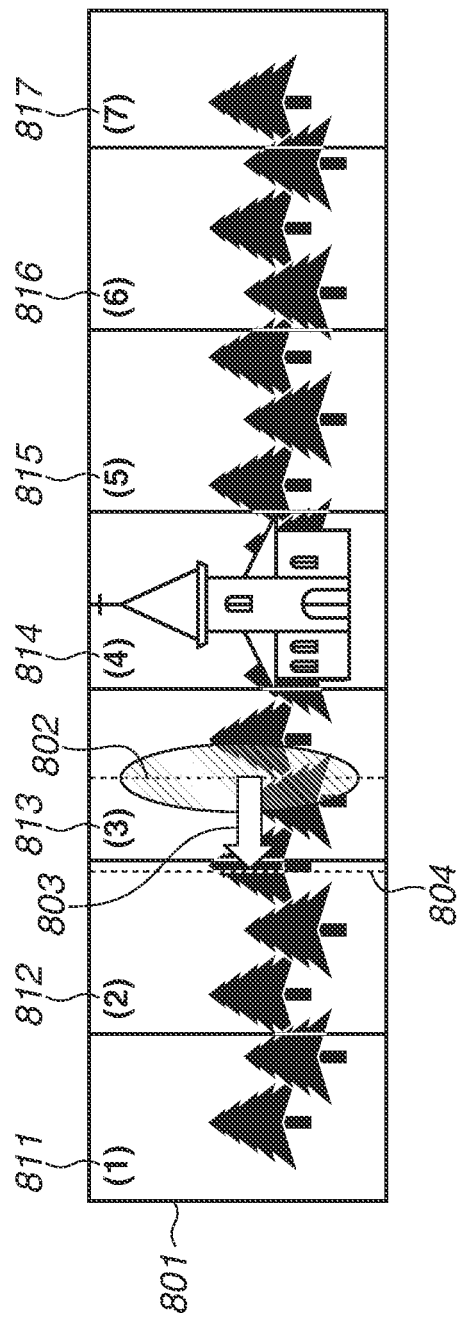
FIG. 8 is a diagram illustrating a foreground image and a background combined image according to one or more aspects of the present.

FIG. 8 is a diagram illustrating a background combined image according to the present exemplary embodiment. The system control unit 210 uses background images 811 through 817 to create a background combined image 801.

Figure 9A:
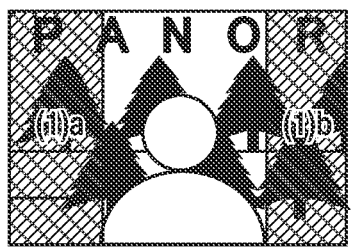
FIGS. 9A, 9B, 9C, 9D, 9E, 9E, 9F, 9G, and 9H are diagrams illustrating generation of a background combined image.
Figure 9B:
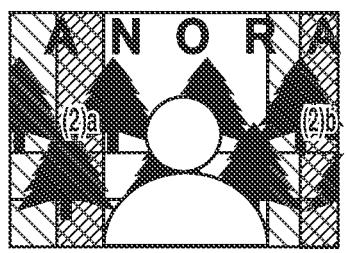
Figure 9C:
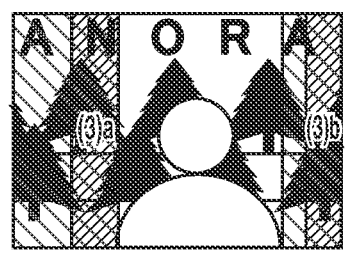
Figure 9D:
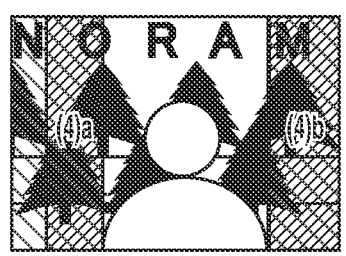
Figure 9E:
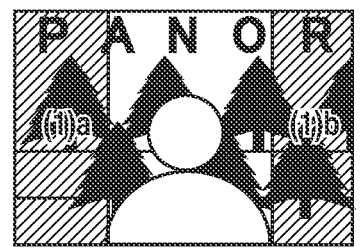
Figure 9F:
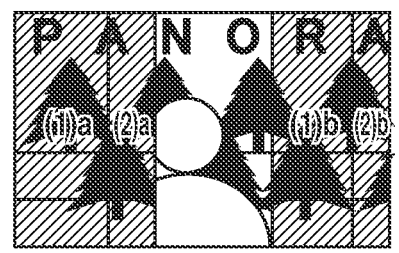
Figure 9G:
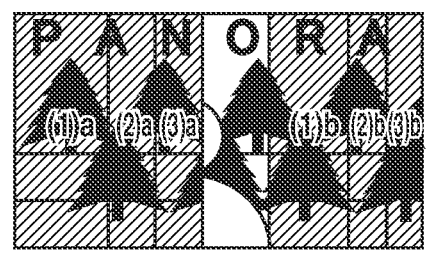
Figure 9H:
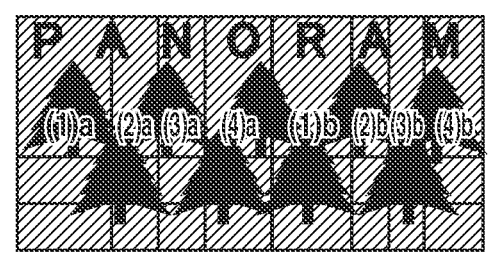

FIGS. 9A through 9H are diagrams illustrating generation of a background combined image. Herein, assuming that a panoramic image is created from four images for the sake of simplicity. FIGS. 9A through 9D illustrate four images acquired by panoramic image capturing. Since a description is herein given of generation of a background combined image, foreground images of the four images are not to be used in combining processing. Each of FIGS. 9E through 9H illustrates a combined image after images illustrated in FIGS. 9A through 9D are used in combining processing. FIG. 9A illustrates that background images a and b (gray portions) are respectively present on both sides of a human figure corresponding to a foreground image. FIG. 9E illustrates a state in which only the background images in the image illustrated in FIG. 9A are used in combining processing. Although FIG. 9E also illustrates a foreground image, this foreground image is eventually overwritten as described below. Accordingly, the foreground image in the image can be deleted after the foreground image is determined not to be used in combining processing. FIG. 9B illustrates an image captured subsequent to the image illustrated in FIG. 9A. Similar to the image illustrated in FIG. 9A, the image illustrated in FIG. 9B includes background images a and b (gray portions) respectively arranged on both sides of a foreground image. FIG. 9F illustrates an image in which the background images in the image illustrated in FIG. 9A and the background images in the image illustrated in FIG. 9B are combined. The system control unit 210 performs the similar processing on images illustrated in FIGS. 9C and 9D to eventually generate a combined image as illustrated in FIG. 9H. In FIG. 9H, any of the foreground images illustrated in FIGS. 9A through 9D is not present, and thus the combined image including naturally joined background images is acquired. When the combining processing is performed up to a fourth image illustrated in FIG. 9D, a gap between a background image on the left side of the fourth image and a background image on the right side of the first image is eliminated. Hence, as for a fifth or a subsequent image, only a background image on the right side of a foreground image can be used in combining processing.

Referring back to FIG. 6, in step S614, the system control unit 210 determines whether the image capturing is finished. If the system control unit 210 determines that the image capturing is ongoing (NO in step S614), the processing returns to step S607. If the system control unit 210 determines that the image capturing is finished (YES in step S614), the processing proceeds to step S615. The system control unit 210 determines whether the image capturing is ongoing or finished based on the user setting made in step S601. For example, if an angle of view set in step S601 is reached, the system control unit 210 determines that the image capturing is finished. In a case where panoramic image capturing in a self-image capturing manner is performed, a photographer often pans an image capturing apparatus while rotating as illustrated in FIG. 5A. The image capturing is preferably finished if a rotation angle reaches 360 degrees. In this case, in step S614, the system control unit 210 can use information about a gyroscope arranged in the detection unit 215 to determine whether image capturing is finished. Alternatively, the system control unit 210 can determine that the image capturing is finished if the user cancels a press of the second switch SW2.

If a panning operation is excessively fast, an angle of view in which there is no image to be used in combining processing may be provided across the entire angle of view of a panoramic image. In such a case, the system control unit 210 can cancel combining processing as necessary, and can prompt the user to capture an image again.

In step S615, the system control unit 210 displays the generated background combined image on the display unit 101, and prompts the user to designate a position of a foreground image. The system control unit 210 sets a position of the foreground image based on an instruction from the user by operation of the touch panel also serving as the display unit 101. Such position setting of the foreground image will be described in detail below.

In step S616, the system control unit 210 calculates an alignment coefficient of a foreground image. The calculation of the alignment coefficient of the foreground image will be described in detail below.

In step S617, the system control unit 210 combines the foreground image and the background combined image. More specifically, the system control unit 210 performs alignment processing on the foreground image based on the alignment coefficient calculated in step S616, and then combines the foreground image and the background combined image. A combining method differs from the above-described method used in generation of a background combined image. The system control unit 210 preferentially uses pixel information of the foreground image in step S617 such that the foreground image is always provided in front of the background combined image. That is, if a pixel of a foreground image subsequent to alignment processing is present at the same position of an image, the system control unit 210 uses the pixel of the foreground image in a final combined image without using a pixel of a background combined image.

<Calculation of Foreground Image Alignment Coefficient>

Next, a detailed description will be given of setting of a foreground image position in step S615 and calculation of a foreground image alignment coefficient in step S616. First, the system control unit 210 determines any of the foreground images extracted in step S608 as a processing target.

In FIG. 8, assuming that a user designates a position 804 as a position at which a foreground image is to be combined. In the present exemplary embodiment, out of the foreground images of the respective images stored in step S612, a foreground image captured at a position closest to the set position 804 is selected. The term "closest" used herein represents that a difference in distance between a middle position in a horizontal width of a foreground image and a setting position in a horizontal direction is smallest. In FIG. 8, out of the foreground images stored in step S612, assuming that a middle position in a horizontal width of the foreground image closest to the set foreground position 804 is arranged at a position 802. In this case, a distance between the set position 804 and the position 802 of the foreground image is a distance 803 between a broken line at the position 804 and a broken line at the position 802. In step S616, the system control unit 210 selects a foreground image with the distance 803 that is the shortest.

However, the aforementioned foreground image selection is one example. The system control unit 210 can search for a foreground image in one direction from the set foreground position 804. For example, the system control unit 210 searches for a foreground image in a closet position on only the right side of the set foreground position 804. The system control unit 210 searches for a foreground image on only one side. This reduces a processing load of the system control unit 210, and thus processing is performed more quickly.

In FIG. 8, the set position 804 and the foreground image position 802 are arranged apart for the sake of clarity. The distance 803 is practically very short since the continuous capturing speed is sufficiently high relative to a panning speed.

Therefore, after identifying a foreground image to be an alignment target, the system control unit 210 calculates an alignment coefficient of such a foreground image. The system control unit 210 uses an alignment coefficient stored in association with the foreground image in step S612 to calculate an alignment coefficient of the foreground image.

Figure 10A:
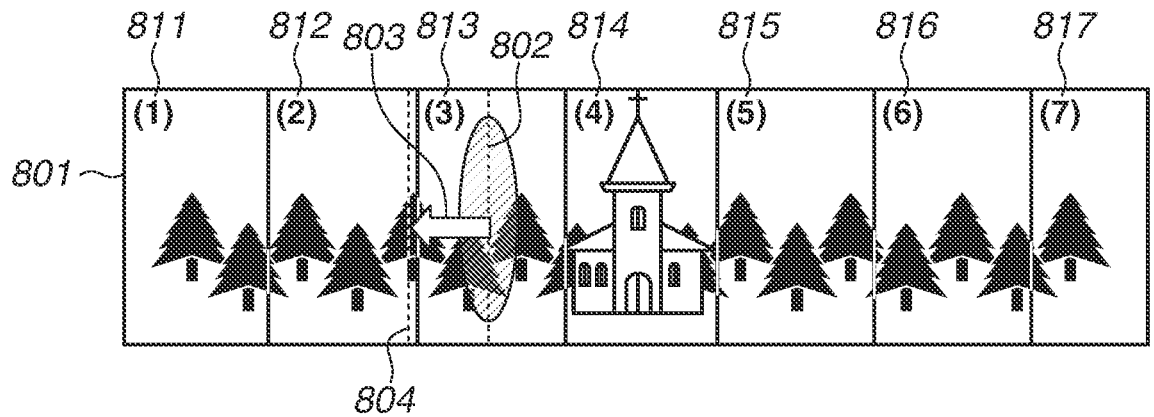
FIG. 10A, FIG. 10B and FIG. 10C are diagrams illustrating calculation of alignment coefficient of a foreground image according to one or more aspects of the present disclosure.
Figure 10B:
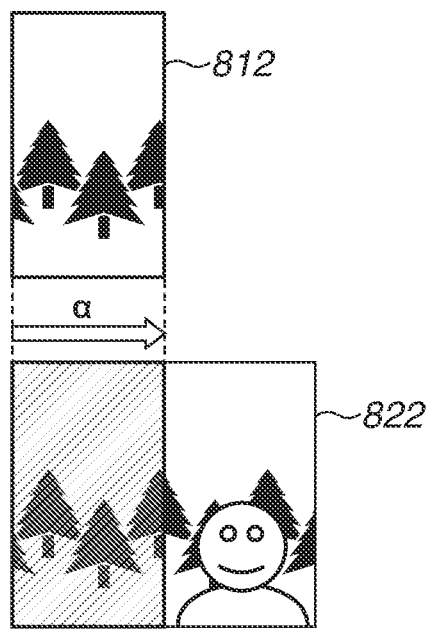
Figure 10C:
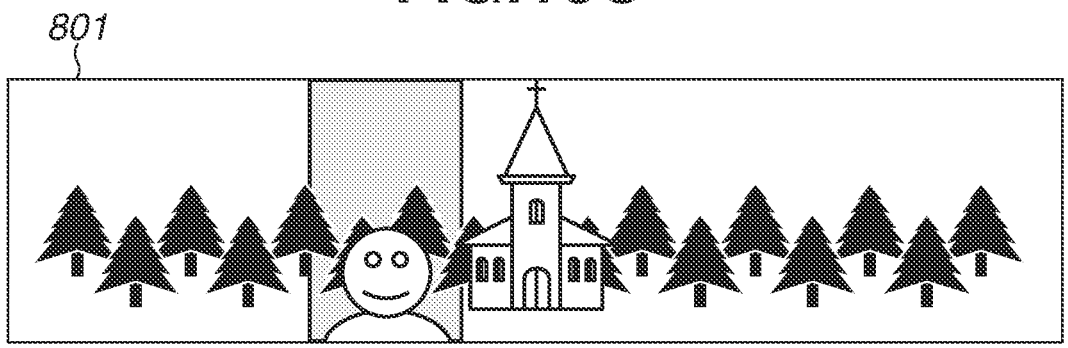

FIG. 10A, FIG. 10B and FIG. 10C illustrate calculation of an alignment coefficient of a foreground image according to the present exemplary embodiment. FIG. 10A is substantially the same as the diagram illustrated in FIG. 8. A foreground image 822 at a position 802 and selected by the system control unit 210 is cut out from the same image from which a background image 812 is cut out. An affine transformation coefficient calculated using an original image including the background image 812 and the foreground image 822 is a coefficient using coordinates on an upper left of the background image 812 as a reference. As illustrated in FIG. 10B, the foreground image 822 is shifted by an amount of $\alpha$ in a horizontal direction relative to the background image 812. The amount of $\alpha$ can be calculated by reading out the information indicating the cutout position which is stored in association with the foreground image 822 in step S612. By using the alignment coefficient (the affine transformation coefficient) stored in association with the foreground image 822 in step S612 and information indicating a cutout position, Expression 5 can be converted into Expression 6.

$$\begin{pmatrix} u' \\ v' \\ 1 \end{pmatrix} = \begin{pmatrix} a & b & c+\alpha \\ d & e & f \\ 0 & 0 & 1 \end{pmatrix} \begin{pmatrix} x \\ y \\ 1 \end{pmatrix} \quad \text{Expression 6}$$

In Expression 6, where α is a distance between a left end of the background image 812 and a left end of the foreground image 822 in a horizontal direction. Expansion of the right side of Expression 5 provides Expression 7.

$$\begin{pmatrix} u \\ v \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} = \begin{pmatrix} ax+by+c \\ dx+ey+f \\ 1 \end{pmatrix} \quad \text{Expression 7}$$

Then, expansion of the right side of Expression 6 provides Expression 8.

$$\begin{pmatrix} u' \\ v' \\ 1 \end{pmatrix} = \begin{pmatrix} a & b & c+\alpha \\ d & e & f \\ 0 & 0 & 1 \end{pmatrix} \begin{pmatrix} x \\ y \\ 1 \end{pmatrix} = \begin{pmatrix} ax+by+c+\alpha \\ dx+ey+f \\ 1 \end{pmatrix} \quad \text{Expression 8}$$

Comparing Expression 7 and Expression 8, u=u'+α, v=v' hold true, which indicates that this can be used for a foreground image that has undergone translational movement by using the affine transformation coefficient illustrated in Expression 6.

Then, this affine transformation coefficient is used for alignment processing on the foreground image 822, and the resultant foreground image 822 is combined at a position 802 of the background combined image 801.

According to the present exemplary embodiment, not only a background combined image can be generated, but also a foreground image at panoramic image capturing can be freely set according to an instruction from a user. Application of such a method to self-image capturing enables a panoramic image including an image of a photographer to be acquired without a sense of strangeness.

According to the present exemplary embodiment, moreover, if a background combined image is generated at the same time as continuous image capturing, an original image is deleted and only a foreground image is stored in a memory. This can save a memory capacity.

Herein, if only a foreground image is stored, a background subject to be an alignment reference is not much included, causing a problem that alignment processing using such a foreground image is difficult. In the present exemplary embodiment, however, an alignment coefficient calculated using the entire image is stored in association with a foreground image. Thus, even if any foreground image is selected, alignment processing can be performed with high accuracy, and the foreground image and a background combined image can be combined.

(Other Embodiment)

The above exemplary embodiment has been described using a digital camera. However, the exemplary embodiment can be applied to a device such as mobile equipment, a smartphone, and a network camera connected to a server as long as such a device has a function of capturing a panoramic image and a function of combining images.

Aspects of the present disclosure can be achieved by a process in which a program for performing one or more functions of each of the above exemplary embodiments is supplied to a system or an apparatus via a network or a storage medium, and one or more processors in a computer of the system or apparatus reads and executes the program. Moreover, aspects of the present disclosure can be achieved by a circuit (e.g., application specific integrated circuit (ASIC)) for performing one or more functions. Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiments). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-194698, filed Oct. 4, 2017, which is hereby incorporated by reference herein in its entirety.

What is claimed is:

1. An image processing apparatus comprising:
at least one memory configured to store instructions; and
at least one processor connected to the at least one memory and configured to execute the instructions to:
determine an alignment coefficient between a plurality of images;
cut out background images and foreground images from the plurality of images;
store a plurality of foreground images cut out from the plurality of images and respective alignment coefficients calculated from each image prior to cutout of each foreground image, the plurality of foreground images being stored in association with respective alignment coefficients; and
generate a background combined image by combining background images cut out from the plurality of images, wherein the at least one processor executes further instruction to select one of the stored plurality of foreground images based on designation of a position in the background combined image, determine an alignment coefficient of the selected foreground image by using the respective alignment coefficient stored in association with the selected foreground image, and combine the selected foreground image and the background combined image by using the determined alignment coefficient of the selected foreground image.

2. The image processing apparatus according to claim 1, wherein the at least one processor executes further instruction to generate the background combined image by using the determined alignment coefficient corresponding to each background image.

3. The image processing apparatus according to claim 1, wherein the at least one processor executes further instruction to determine the alignment coefficient of the selected foreground image based on the alignment coefficient stored in association with the selected foreground image and information indicating a position at which the selected image is cut out.

4. The image processing apparatus according to claim 1, wherein the at least one processor executes further instruction to select a foreground image having a shortest distance to a designated position in the background combined image.

5. The image processing apparatus according to claim 1, wherein the alignment coefficient is an affine transformation coefficient or a projective transformation coefficient.

6. The image processing apparatus according to claim 1, wherein the foreground image includes a human figure.

7. The image processing apparatus according to claim 6, wherein the foreground image includes a human figure of a photographer who has captured the plurality of images.

8. The image processing apparatus according to claim 1, wherein the plurality of images is captured by using panning operation.

9. The image processing apparatus according to claim 1, wherein the designation of the position in the background combined image is performed by a user.

10. An image capturing apparatus comprising:
an image sensor configured to capture a plurality of images;
at least one memory configured to store instructions; and
at least one processor connected to the at least one memory and configured to execute the instructions to:
determine an alignment coefficient between the plurality of images;
cut out background images and foreground images from the plurality of images;
store a plurality of foreground images cut out from the plurality of images and respective alignment coefficients calculated from each image prior to cutout of each foreground image, the plurality of foreground images being stored in association with respective alignment coefficients; and
generate a background combined image by combining background images cut out from the plurality of images,
wherein the at least one processor executes further instruction to select one of the stored plurality of foreground images based on designation of a position in the background combined image, determine an alignment coefficient of the selected foreground image by using the respective alignment coefficient stored in association with the selected foreground image, and combine the selected foreground image and the background combined image by using the determined alignment coefficient of the selected foreground image.

11. A method for image processing comprising:
determining an alignment coefficient between the plurality of images;
cutting out background images and foreground images from the plurality of images;
storing a plurality of foreground images cut out from the plurality of images and respective alignment coefficients calculated from each image prior to cutout of each foreground image, the plurality of foreground images being stored in association with respective alignment coefficients;
generating a background combined image by combining background images cut out from the plurality of images;
selecting one of the plurality of foreground images stored by the storing based on designation of a position in the background combined image;
determining an alignment coefficient of the selected foreground image by using the respective alignment coefficient associated with the selected foreground image and stored by the storing; and
combining the selected foreground image and the background combined image by using the alignment coefficient of the selected foreground image.

* * * * *